June 7, 1960

R. W. LUNDQUIST 2,939,458

RESPIRATORY MASKS

Filed April 29, 1957

INVENTOR.
ROY W. LUNDQUIST

BY *Grover Q. Frater*

ATTORNEY

June 7, 1960 R. W. LUNDQUIST 2,939,458
RESPIRATORY MASKS

Filed April 29, 1957 3 Sheets-Sheet 2

INVENTOR.
ROY W. LUNDQUIST
BY
*Grover A. Fater*
ATTORNEY

INVENTOR.
ROY W. LUNDQUIST
ATTORNEY

2,939,458
RESPIRATORY MASKS

Roy W. Lundquist, Davenport, Iowa, assignor to Bendix Aviation Corporation, Davenport, Iowa, a corporation of Delaware Filed Apr. 29, 1957, Ser. No. 655,661

5 Claims. (Cl. 128—146)

This invention relates to improvements in respiratory masks. While not limited to aircraft uses, it provides a solution to difficult problems which attend very high altitude air travel and is best described in connection with this application.

Better atmospheric conditions for aircraft flight result in increased efficiency of jet and turbo-jet propelled aircraft at high altitudes and is a cogent reason for flight at these altitudes. However, if when flying at high altitude, decompression of the cabin should occur, the effect upon passengers and crew would be disastrous. Death occurs about forty-five seconds following complete decompression at forty thousand feet. Brain damage being after only 15 seconds. Accordingly, a prerequisite to safe air travel at these altitudes is the provision of some means for rapidly administering oxygen to each passenger and crew member. The provision of an oxygen mask which can be effectively applied in the short time available, without instruction, is an object of the invention.

Decompression is often accompanied by loud noise and discomfort or pain. Passengers may have been asleep, or away from their seats, and they will be excited. Another object of the invention is to provide a mask which can be almost instinctively applied with either hand to one's own or a fellow passenger's face and which will fit all faces, including infant's faces and faces with mustaches or eyeglasses, and will require no special orientation in use on any face.

Certain of these objects are realized by the provision of a mask having a face-engaging portion or annulus connected flange-like to one end of a mask body which encloses or forms a breathing chamber. Wall elements extending from the mask body are adapted to support and facilitate operation of a gas supply element.

The mask is held to the face so that the wearer's nose and mouth face the breathing chamber and are encircled by the face-engaging annulus. Advantageously the mask, when relaxed, is symmetrical, and the face-engaging annulus is circular about the axis along which it is applied to the face, obviating the necessity for special rotational orientation before application to the face.

The mask will be deformed by comfortable pressure toward the face to follow the contour of the face. It responds to this pressure to deform in the radial or transverse direction to encircle the wearer's nose and mouth, following the contour of the face over the bridge of the nose and along the sides of the nose, over the cheeks into any depressions at the sides of the mouth, and over the frontal area of the chin. In addition, in response to the same pressure, the mask deforms axially in the in-and-out direction to follow the smallest facial contour sufficiently to seal against the face along an annular surface around the nose and mouth. The problem is to provide the required transverse or radial flexibility while precluding axial collapse of the mask due to the required hand pressure. In this connection an object of the invention is to provide a mask structure which combines high axial flexibility for sealing to the face with high transverse flexibility for proper encirclement of the face.

The mask must seal against the face to prevent influx of air during inhalation and egress of exhaled gas during exhalation. Advantageously an annular, marginal portion of the face-engaging annulus is made of a membrane that has the high axial and circumferential flexibility required to deform and stretch into the lines and over the ridges of the face.

In one form of the invention the face-engaging portion comprises a pair of flanges diverging toward the face to form an annular suction cup. This construction, which advantageously includes a very thin membrane at the outer margin of both flanges, provides an especially effective seal against the face. A pressure-sensitive adhesive coating fixed to one or both of the flanges at the side toward the face provides additional advantages. Provision of a mask employing a double seal, suction cup action and an adhesive coating to hold the mask to the face are additional objects of the invention.

Another object is to provide a mask which may be molded as a unitary structure from standard elastomers.

Another object of the invention is to provide a mask which will facilitate the operation of gas flow control apparatus, and is realized by including special characteristics in a support for such apparatus and, advantageously, by a provision for optional admission of atmospheric air into the mask along with the respiratory gas.

Other objects and advantages of the invention, among them the provision of a mask which is easily stripped from its gas flow control apparatus for cleaning, which is easily cleaned, and is light in weight and readily mass produced, will be apparent in the description which follows.

Certain embodiments of the invention are illustrated in the accompanying drawing, it being understood that other embodiments of the invention are possible and various modifications of the embodiment illustrated may be made without departing from the spirit of the invention or the scope of the appended claims.

The function of these masks, in addition to enclosing the breathing chamber, is to seal the chamber at the face against air flow into the chamber and against flow of gas out of the chamber.

To insure performance of the sealing function, a first annular region of the face-engaging annulus is made very flexible so that it is readily deformed axially and stretched circumferentially to follow the contour of the face. So that this annular portion will be held pressed to the face, a second annular region of the face-engaging annulus preferably less readily deformable axially and radially, is made to oppose circumferential stretching. When pressed against the face, the second region will bend about the nose and chin to allow those portions of the face-engaging annulus between these points to be moved inwardly toward the cheeks and the sides of the nose, thus to carry the first or very flexible region into annular contact with the face.

The pressure by which the mask is pressed to the face is transmitted to the annulus through the mask body, which is connected to said second annular region of the annulus. The mask body is easily deformable transversely or radially so that its sides, between the wearer's nose and chin, are drawn inwardly against the cheeks. However, the mask body is not as readily deformable longitudinally or axially. Thus axial pressure is transmitted through the body to said second region of the annulus and causes the latter to bulge at the points of least pressure against the face or, specifically, at the sides of the wearer's nose and at any depressions near his mouth.

The sealing action of the very flexible first region is aided by gas pressure forcing it against the face. In certain applications, for example where the gas flow regulator controls both the supply and exhausting of gas, it is required that the mask be sealed from atmosphere at the face against flow both into and out of the breathing chamber. In such applications two very flexible annular sections may advantageously be employed, one subjected to gas pressure in the breathing chamber and the other subjected to atmospheric pressure. These sections form the inner and outer peripheral portions, respectively, of the face-engaging annulus which is connected at an intermediate annular portion to the mask body. By arranging this structure so that the connection flexes more readily than the face-engaging portion of the mask to which it is fixed, inward pressure of the face on the inner area of the face-engaging annulus will cause the annulus to pivot, as the connection is flexed hinge-like, to carry the outer area of the annulus forward and inward toward the face.

Figure 1:
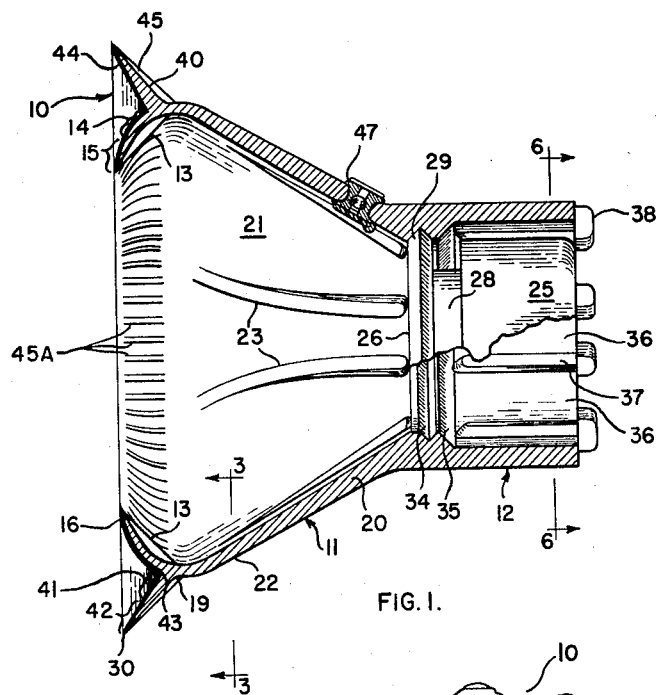
Fig. 1 is a view in central section of a mask embodying the invention, assembled with a gas regulator shown fragmented and in side elevation.

These features may advantageously be embodied in the mask form selected for illustration in Fig. 1, and which comprises a face-engaging annulus 10 connected to one end of a mask body 11, and a gas regulator support 12 connected to the other end of the body.

The face-engaging annulus 10 comprises an inner flange 13 extending inwardly from the mask body and having an outer annular region deformable to encircle the face and carry an inner annular and highly axially flexible region into sealing engagement with the face. In the embodiment shown, these inner and outer annular regions are designated 14 and 15 respectively, and are formed by tapering the flange 13 toward its central opening. The opposite surfaces of the flange 13 converge arcuately toward the face. They converge toward one another at an acute angle, and terminate at the inner margin at the region 15 in a thin membrane 16. The flange is formed of an elastic material which at the membrane 16 is easily deformed axially into depressions in the face and which will stretch circumferentially over projecting surfaces of the facial contour.

The region 14, being thicker in cross-section, is less susceptible to circumferential stretching, and when pressed to the face against the bridge of the nose and frontal area of the chin will bend at these points. The areas of the flange 13 between the nose and chin will be folded forwardly and inwardly toward the face. The outer margin of flange 13 is joined to the mask body by an annular flexible connection at 19.

One purpose of the mask body is to enclose a breathing chamber, another is to transmit to the face-engaging annulus the pressure by which it is pressed to the face. The mask body is made transversely or radially flexible so that it will follow movement of the face-engaging flange as the latter is folded around the face. It has axial stiffness to transmit axial pressure to the annulus without collapsing. Advantageously, some axial deformability in the body or the connection between the body and face-engaging annulus is provided so that the end of the body will deform at the nose and chin, permitting the regions of the end between the nose and chin to extend past these points toward the face. This axial deformability is advantageously confined to the end of the body near the face-engaging annulus 10, the greater axial stiffness away from said end providing a region at which force may be uniformly applied for distribution to the annulus in accordance with the pressure encountered in contact with the face, without substantial axial deformation in that region.

One mask body form in which these functions are provided is that shown in Fig. 1, where the body 11 decreases in radial dimension away from its end 22, here shown as frusto-conical, and comprises an annular wall 20 enclosing a breathing chamber 21. Its larger end 22 is connected at 19 to the face-engaging annulus 10. The wall section is tapered toward end 22. This construction provides greater transverse than axial flexibility, and it provides increased axial and transverse flexibility in the direction toward end 22. These characteristics are advantageously augmented by ribs 23 formed integrally with the elastic body 11 on its inner surface, spaced radially around the body, extending longitudinally and tapered toward end 22 of the body.

The end of the mask body away from the annulus 10, being least deformable axially and transversely, is well suited to supporting respiratory gas supply apparatus. Wall elements fixed to this portion of the body and made of elastic material are formed as a receptacle for such apparatus. The receptacle is advantageously proportioned to elastically grip the gas supply apparatus in communication with the breathing chamber of the mask and to embrace it to seal the breathing chamber from the atmosphere.

A form of support especially suited for use with a regulator which controls both the supply of respiratory gas and the expulsion of exhaled gas is designated 12 in Fig. 1. A suitable regulator is disclosed in patent application Serial No. 704,701, filed December 23, 1957, by Norman J. Hosford. Such a regulator 25 is shown in operative position in support 12. The regulator is generally cylindrical; its end face 26 is provided with a gas supply outlet and an exhaust gas inlet, not shown, and its outer margin 29 is V-shaped and larger in diameter than the regulator body. A recess 28 in the body forms an exhaust port for exhaled gas entering at the end face 26. The support 12 as shown comprises a cylindrical extension of the mask body 11 and projects axially from the smaller end of the mask body. The regulator 25 is disposed in the support with its end face 26 exposed to the breathing chamber 21.

Figure 6:
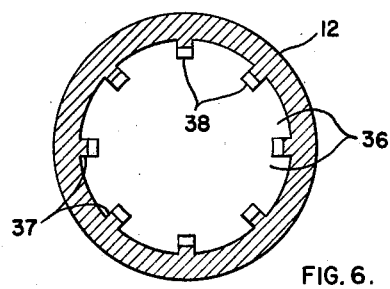
Fig. 6 is a view in transverse section taken on line 6—6 of Fig. 1.

The V-shaped annular margin 29 of the regulator end face 26 is fitted into a complementary V-shaped groove 34 of smaller diameter on the interior of support 12. Thus the support at groove 34 elastically embraces the margin 29 and provides a seal against the flow of gas into or out of the breathing chamber 21 past the margin 29 and constrains the regulator against axial movement relative to the support 12. A second V-shaped annular groove 35 on the inner surface of the support opposite the exhaust recess or port 28 conducts exhaust gas flow to a plurality of spaced longitudinal grooves 36 formed on the inner surface of the support 12 and extending from groove 35 to the atmosphere. This construction is best illustrated in Figs. 1 and 6.

Ribs 37, formed by grooves 36, elastically grip the regulator body, and extensions 38 of these ribs may be formed over the outer end of the regulator to prevent sealing of the end of the support 12 and the regulator 25 by the palm of a hand placed over the end of the support instead of ending the regulator support ahead of the end of the regulator.

In addition to the inner flange, the face-engaging annulus 10 advantageously further comprises an outwardly extending section, the outer peripheral region of which is very flexible axially and will stretch circumferentially to seal against the face when pressed thereagainst. Arrangement of the inwardly and outwardly extending sections of the face-engaging annulus so that they diverge toward the face in a V- or Y-shaped cross-section provides an annular suction cup. Pressed to the face to force air out from between the sections, the very flexible inner and outer margins of the inner and outer sections of the annulus will be held in sealing engagement with the face by gas pressure in the mask and by atmospheric pressure respectively.

When the face-engaging flange is to require no rotational orientation when applied to the face, it must have the same shape in every radial plane. That is, it must be formed as the generation of an area about the mask axis. This precludes arrangement of the sides of the V- or Y-shaped annulus so the ends of the sides can be brought into annular contact with the face at the same time because of the irregularity of the face, especially in the region of the nose. To overcome this difficulty, the face-engaging annulus between its very flexible inner and outer margins is made stiff relative to the connection between the annulus and mask body, so that pressure on the annulus at one side of the connection will result in flexure of the connection. Thus, in application of the mask, if at some radial sector one side of the annulus is pressed against the face before the other side contacts the face, the connection between that radial sector of the annulus and the mask body will flex hinge-like, allowing the annulus to rock or pivot about the connection to carry the unengaged side of the annulus into contact with the face.

In Fig. 1 the face-engaging annulus 10 is provided with such an outer portion or flange. In the form selected for illustration, the outer flange 40, like the inner flange 13 is tapered in the direction away from the connection 19 to the mask body. A region 41 near the connection 19 is readily deformable both axially and transversely but opposes circumferential stretching. Another region 42 at the outer area of flange 40 tapers to a thin membrane, is very flexible axially and is easily stretched circumferentially for sealing engagement with the face.

The regions 41 and 42 of the outer flange 40 correspond in function to the regions 15 and 14, respectively, of the inner flange 13. That is, the region 40 seals against the face when held in contact to the face by bending or folding of the region 41 in response to force applied thereto through the mask body 11 and connection 19.

The flanges 13 and 40 diverge toward the face and are connected at their juncture 43 so that the annulus 10 is V-shaped in cross-section. When both flanges of the annulus 10 engage the face further pressure will force out air trapped between them and the annulus will tend to act as a suction cup.

When the face-engaging annulus 10 is rocked, pivoted or rolled, as described, about the flexible connection 19 to bring one of the flanges against the face upon initial engagement of the other with the face, one flange must increase and the other must decrease in circumference. This requires that the flanges be capable of stretching and compressing circumferentially. No problem is presented by the inner and outer regions 14 and 42 of the annulus since these regions are very flexible and resilient as described. The difficulty arises in providing for stretching in the stiffer regions of the flanges. These must be sufficiently stiff axially to cause flexure at connection 19 so that one will be carried toward the face when the other is first to contact the face. Means are advantageously provided to insure the required axial stiffness while permitting the required change in circumference.

Figure 3:
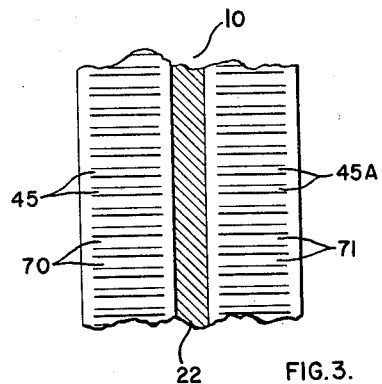
Fig. 3 is a fragmentary view taken on line 3—3 of Fig. 1.

In Fig. 1 these means take the form of radially spaced longitudinal grooves in the face-engaging annulus 10 in the surface of the annulus opposite the face. As best illustrated in Fig. 3, one set of grooves 45 is formed in the inner flange 13 to leave ribs 70 and another set 45a is formed in the outer flange 40 to leave ribs 71. The grooves extend entirely around the annulus in both flanges and advantageously become progressively deeper in the direction toward the connection 19.

Figure 2:
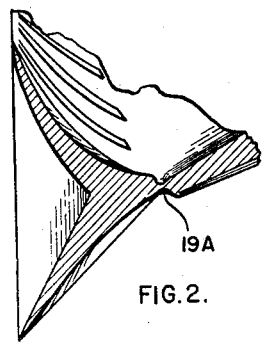
Fig. 2 is a fragmentary, sectional view of a modification of the mask of Fig. 1.

If preferred, the hinge-like action at the mask body-flange connection 19 may be enhanced by reducing the thickness of this connection as illustrated at 19a in Fig. 2 to increase flexibility at the connection.

In certain applications of the mask it is desirable to provide additional means for holding the mask to the face. An adhesive covering on the side of the face-engaging annulus toward the face, which adheres more tenaciously to the mask than to the face, provides such means. The covering may comprise an elastic backed, pressure sensitive, medically safe adhesive tape of a type well known, the elastic backing being bonded to the surface of the annulus. In Fig. 1 the face-engaging annulus 10 is shown as provided with such a covering 44 extending around the annulus and over, in this embodiment, both flanges 13 and 40.

Figure 4:
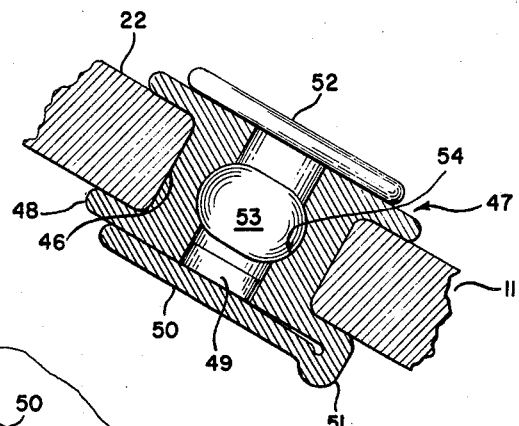
Fig. 4 is an enlargement of a portion of Fig. 1 illustrating an air dilution valve.
Figure 5:
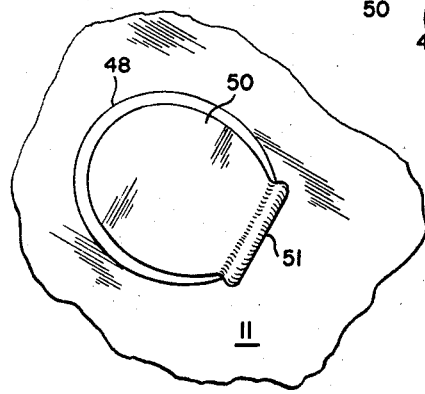
Fig. 5 is a bottom view of the valve shown in Fig. 3 showing a fragment of the mask wall.

In certain circumstances it is desirable to dilute the oxygen supplied to the mask user with atmospheric air. This may be accomplished to advantage by providing an air inlet opening in the mask wall, means for closing the opening except during inhalation and means for maintaining the opening closed when air dilution of the oxygen is not desired. Advantageously, this structure may have the form shown in Figs. 1, 4, and 5.

An opening 46 may be provided as shown in the wall 20 of the mask body 11, in which is inserted, or molded in situ, a check valve 47 preferably formed of an elastic material. The seat 48 forms a grommet having flanged ends which grip the mask wall 20 at the edges of opening 46 between them and prevent air flow into the breathing chamber except through the seat opening 49. The valve further comprises a flap closure, shown as a head 50 and a deformable hinge connection 51 between the head and seat, the whole valve structure being integrally formed in this embodiment. The head 50 is a flap which is normally held closed by its elasticity and that of the hinge connection 51, but which, when the shut-off plug 52 is removed, will open in response to suction in the breathing chamber 21 to admit air through opening 46. When air dilution is not desired, plug 52 is inserted in opening 46 where it is retained in place by an enlarged section 53 and a corresponding depression 54 in the wall of seat opening 46.

Figure 7:
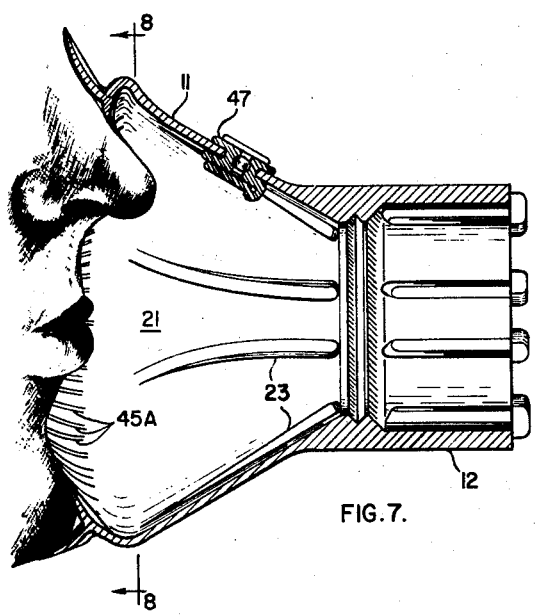
Fig. 7 is a view in longitudinal central section of the mask of Fig. 1 illustrating its application to a face.
Figure 8:
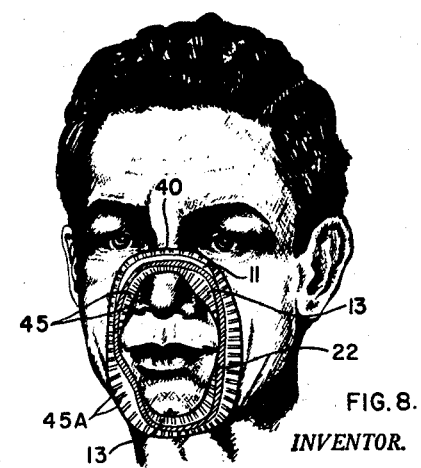
Fig. 8 is a sectional view taken on line 8—8 of Fig. 7.

The operation of the mask of Fig. 1 is illustrated in Figs. 7 and 8, it being understood that the shape of the mask during use will vary somewhat with the shape of the face and the amount of pressure by which it is applied to the face. Fig. 7 illustrates how the face-engaging flange 10 is rocked or pivoted at the chin and especially at the nose by pressure against the inner flange and flexure at connection 19 to carry the outer flange into contact with the face, the membrane sections 16 and 30 lying against the face to effect a seal. The mask body is deformed both transversely and axially, especially at the nose, where the degree of deformation is greatest at the end of the mask body closest to the face-engaging annulus 10. Fig. 8 illustrates how the sides of the face-engaging annulus and the mask body between the nose and chin are forced radially inwardly toward the cheeks so that the mask is generally oval-shaped, the region 14 of the inner flange 13 being bulged toward the sides of the nose and into recesses around the mouth.

Figure 9:
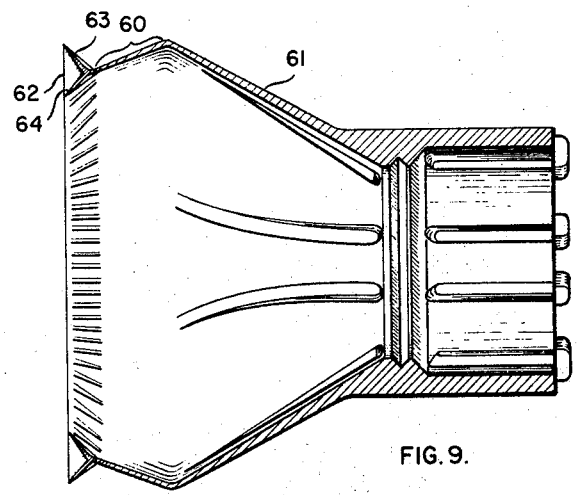
Fig. 9 is a view in central section of a modified form of the mask.

In Fig. 1, the connection 19 is a narrow annular portion of the mask between the face-engaging annulus 10 and the mask body. It is not essential that the connection or the function it provides be limited to this small width. This is illustrated in Fig. 9, where a modified form of mask having a relatively wide connecting portion 60 is shown. In this mask, the mask body 61 is very similar to mask body 11 of Fig. 1. The face-engaging annulus 62 comprises inner and outer flanges 63 and 64, respectively, which may be grooved as shown and, except for having a straight taper and omission of the adhesive covering, are like the flanges of the face-engaging annulus 10 of Fig. 1. Advantageously, the greater length in the connection 60 permits the face-engaging flange to be turned or rolled so that both flanges engage the face, with less flexure per unit length of the connection 60. Thus less force is required for full engagement of the face by the face-engaging annulus 62 without resorting to reduction of the connection wall thickness, which in certain instances is less desirable because of the possibility of axial collapse of such a thin section under the pressure used to hold the mask to the face.

Figure 10:
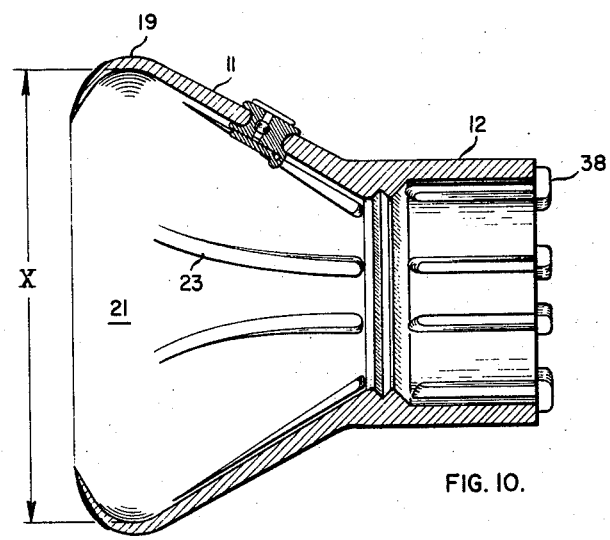
Fig. 10 is a view in longitudinal central section of another modified form of the mask.

In certain applications of the mask the outer flange of the face-engaging annulus is advantageously omitted as illustrated in Fig. 10, and except that the flange grooves have been omitted for clarity, this mask is otherwise identical in structure and function to the mask of Fig. 1.

Advantageously, an elastomer is used and the masks are molded as integral units which can be stretched and stripped from molding forms in manufacture and from the gas supply apparatus for cleaning and sterilization. An elastomer which will not absorb moisture, is easily cleaned and which will not change its characteristics under extremes of heat and cold is preferred. A suitable synthetic resin, and particularly a silicone, has been discovered to work best, especially for aircraft use.

To illustrate specifically certain advantageous and preferred features of the invention, and particularly the relative flexibility and deformability of different parts of the mask, Figs. 1, 9, and 10 are drawn to scale. All are drawn to the same scale in which the dimension X in Fig. 10 is 3.5 inches when the masks are formed of an elastomer, preferably a silicone, exhibiting a durometer hardness from 20 to 60.

I claim:

1. A face mask comprising a transversely flexible mask body having an inwardly turned, circular, annular face-engaging flange, the opposite surfaces of said flange converging at an acute angle toward the central opening and there terminating in a thin membrane.

2. A face mask comprising a mask body and an elastic inwardly turned face-engaging annulus connected to said body, the opposite surfaces of said flange converging at an acute angle toward the central opening and there terminating in a thin membrane, and the side of said annulus toward said body having a plurality of radially extending grooves formed therein and spaced around said annulus.

3. A face mask comprising a mask body and a resilient face-engaging annulus including inner and outer flanges connected at their juncture to said body by an annular connection of reduced thickness and substantially greater flexibility than the adjacent portions of said body and mask.

4. The invention defined in claim 3 in which at least one of said flanges is provided with an adhesive coating on its face-engaging side.

5. A face mask comprising a mask body and a resilient face-engaging annulus including inner and outer flanges divergent from their junction toward the face and joined at said junction to said body by an annular hinge-action flexible connection, the side away from the face of at least one of said flanges having a plurality of radially extending grooves formed therein and spaced around said one flange.

References Cited in the file of this patent

UNITED STATES PATENTS

| | | |
|---|---|---|
| 2,166,164 | Lehmberg | July 18, 1939 |
| 2,382,364 | Yant | Aug. 14, 1945 |
| 2,465,973 | Bulbulian | Mar. 29, 1949 |
| 2,706,983 | Matheson | Apr. 26, 1955 |
| 2,809,633 | Swearingen | Oct. 15, 1957 |

FOREIGN PATENTS

| | | |
|---|---|---|
| 158,869 | Australia | Sept. 15, 1954 |
| 716,634 | Great Britain | Oct. 13, 1954 |